United States Patent
He

(10) Patent No.: US 10,778,989 B2
(45) Date of Patent: Sep. 15, 2020

(54) ROLLING INTRA PREDICTION FOR IMAGE AND VIDEO CODING

(71) Applicant: BlackBerry Limited, Waterloo (CA)

(72) Inventor: Dake He, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 757 days.

(21) Appl. No.: 15/016,887

(22) Filed: Feb. 5, 2016

(65) Prior Publication Data

US 2017/0230673 A1   Aug. 10, 2017

(51) Int. Cl.
| | | |
|---|---|---|
| *H04N 19/176* | (2014.01) | |
| *H04N 19/182* | (2014.01) | |
| *H04N 19/503* | (2014.01) | |
| *H04N 19/147* | (2014.01) | |
| *H04N 19/61*  | (2014.01) | |
| *H04N 19/11*  | (2014.01) | |
| *H04N 19/105* | (2014.01) | |

(52) U.S. Cl.
CPC ......... *H04N 19/176* (2014.11); *H04N 19/105* (2014.11); *H04N 19/11* (2014.11); *H04N 19/147* (2014.11); *H04N 19/182* (2014.11); *H04N 19/503* (2014.11); *H04N 19/61* (2014.11)

(58) Field of Classification Search
CPC .. H04N 19/176; H04N 19/182; H04N 19/503; H04N 19/105; H04N 19/11; H04N 19/147; H04N 19/61
USPC .................................................. 375/240.12
See application file for complete search history.

(56) References Cited

U.S. PATENT DOCUMENTS

| | | | | |
|---|---|---|---|---|
| 2007/0053433 A1* | 3/2007 | Song | ............... | H04N 19/147 375/240.13 |
| 2010/0111175 A1* | 5/2010 | Wang | ............... | H04N 19/61 375/240.12 |

FOREIGN PATENT DOCUMENTS

EP   1761063 A2   3/2007

OTHER PUBLICATIONS

Y.-L. Lee, K.-H. Han and G. J. Sullivan, "Improved lossless intra coding for H.264/MPEG-4 AVC," IEEE Trans. Image Processing, vol. 15, No. 9, pp. 2610-2615, 2006.
X. Cao, X. Peng, C. Lai, Y. Wang, Y. Lin, J. Xu, L. Liu, J. Zheng, Y. He, H. Yu and F. Wu, CE6.b1 Report on Short Distance Intra Prediction Method, Geneva, Switzerland: JCTVC-E278, 2011.
(Continued)

*Primary Examiner* — Matthew K Kwan
(74) *Attorney, Agent, or Firm* — Rowand LLP

(57) ABSTRACT

Methods and devices for image and video coding using rolling intra prediction. The encoder selects a mode for a current block, the current block having a plurality of neighboring reference samples from an adjacent block, wherein the mode is associated with a prediction function. A predicted block of predicted pixels is constructed by initially determining at least some of the predicted pixels based on the prediction function with one or more of the neighboring reference samples as inputs to the prediction function, and by determining at least some other of the predicted pixels based on the prediction function with the at least some of the predicted pixels as inputs. The process proceeds to build the predicted block in a traversing order using predicted pixels of the same predicted block as inputs to the prediction function for determining other predicted pixels of the predicted block. The decoder performs the same prediction process.

18 Claims, 10 Drawing Sheets

(56) References Cited

OTHER PUBLICATIONS

Y. Wang, J. Chen and Y. He, "A pixel-wise directional intra prediction method," J. Vis. Commun. Image R., pp. 599-603, 2012.
A. Gabriellini, D. Flynn, M. Mrak and T. Davies, "Combined intra prediction for High Efficiency Video Coding," IEEE J. Selected Topics in Signal Processing, vol. 5, No. 7, pp. 1282-1289, 2011.
M. Karczewicz, J. Chen, W.-J. Chien, X. Li, A. Said, J. Zhang and X. Zhao, Study of coding efficiency improvements beyond HEVC, Geneva, Switzerland: MPEG m37102, 2015.
A. Minezawa, K Sugimoto and S.-i. Sekiguchi, An improved intra vertical and horizontal prediction, Torino, Italy: JCTVC-F172, 2011.
A. Lempel and J. Ziv, "Compression of two-dimensional data," IEEE Trans. Inform. Theory, vol. 32, No. 1, pp. 2-8, 1996.
E. Artyomov, Y. Rivenson, G. Levi and O. Yadid-Pecht, "Morton (Z) scan based real-time variable resolution CMOS image sensor," IEEE Trans. Circuits and Systems for Video Technology, vol. 15, No. 7, pp. 947-952, 2005.
International Organisation for Standardisation, Organisation Internationale de Normalisation, ISO/IEC JTC I/SC 29N/G 11, Coding of Moving Pictures and Audio, Geneva, CH—Feb. 2015.
EPO, Extended European Search Report, relating to EP application No. 17154343.2 dated Jul. 21, 2017.
Kim, H.Y. et al., "Video coding technology proposal by the Electronics and Telecommunications Research Institute (ETRI)", 1. JCT-VC Meeting; Apr. 15, 2010-Apr. 23, 2010; Dresden; (Jointcollaborative Team on Video Coding of ISO/IEC JTC1/SC29/WG11 and ITU-TSG.16); URL: http://wftp3.itu.int/av-arch/jctvc-site/,, No. JCTVC-A127, Apr. 17, 2010, XP030007580, ISSN: 0000-0049, pp. 8, 10, p. 22-23.
Kimata H. et al., "Recursively weighting pixel domain intra prediction on H.264", Visual Communications and Image Processing; Jul. 8, 2003-Jul. 11, 2003; Lugano, Jul. 8, 2003, XP030080822, abstract, section 3 with figures 1-4.
Yamane N. et al., "An Image Data Compression Method Using Extrapolative Prediction-Discrete Sine Transform; in the Case of Two-Dimensional Coding", Electronics & Communications in Japan, Part I—Communications Wiley, Hoboken, NJ, US, vol. 72, No. 6, Part 01, Jun. 1, 1989, pp. 84-92, XP000086294, ISSN: 8756-6621, abstract, sections 2-2.1 with figures 1-3.
"An overview of new video coding tools in VP10", Not Known, no. Future_Video_Coding_Workshop_3, Nov. 21, 2015, XP030001654, pp. 11, 30, in particular the figure on p. 11.
Zhu Gang et al, "The intra prediction based on sub block", Signal Processing, 2004. Proceedings. ICSP 04. 2004 7th International Conference on Beijing, China Aug. 31-Sep. 4, 2004, Piscataway, NJ, USA, IEEE, Piscataway, NJ, USA,vol. 1, Aug. 31, 2004, pp. 467-469, XP010809662, ISBN: 378-0-7803-8406-4, abstract, section 2 "Intra prediction based on sub block (SB Intra Prediction)" with figures 1-4.
Chia-Yuan Teng et al., "A new quadtree predictive image coder", Proceedings of the International Conference on Image Processing. (ICIP), Washington, Oct. 23-26, 2019; [Proceedings of the International Conference on Image Processing. (ICIP)], Los Alamitos, IEEE Comp., Soc. Press, US, vol. 2, Oct. 23, 1995, pp. 73-76, XP010196975, DOI: 10/1109/ICIP.1995.537418, ISBN: 978-0-7803-3122-8, whole document.
Kim (ETRI) H Y et al.: Video Coding Technology Proposal by the Electronics and Telecommunications Reserach Institute (ETRI) Apr. 17, 2020.
Kamisli Faith: "Intra Prediction Based on Markov Process Modeling of Images" Oct. 1, 2013.
EP Office Action relating to European Patent Application No. 17154343.2 dated Jun. 8, 2020.

* cited by examiner

*Example Pixel Values*

| -29 | -2 | 81 | 87 | 77 | 66 | 52 | 24 | 0 | -12 |
|---|---|---|---|---|---|---|---|---|---|
| -17 | 24 | 91 | 85 | 77 | 0 | 0 | 0 | 0 | 0 |
| -16 | 45 | 93 | 83 | 73 | 0 | 0 | 0 | 0 | 0 |
| -14 | 49 | 89 | 82 | 63 | 0 | 0 | 0 | 0 | 0 |
| -12 | 70 | 87 | 79 | 64 | 0 | 0 | 0 | 0 | 0 |
| -12 | 0 | 0 | 0 | 0 | 0 | 0 | 0 | 0 | 0 |
| -12 | 0 | 0 | 0 | 0 | 0 | 0 | 0 | 0 | 0 |
| -12 | 0 | 0 | 0 | 0 | 0 | 0 | 0 | 0 | 0 |
| -12 | 0 | 0 | 0 | 0 | 0 | 0 | 0 | 0 | 0 |
| -12 | 0 | 0 | 0 | 0 | 0 | 0 | 0 | 0 | 0 |

*Example construction of work block*

|  |  |  |  |  |  |  |  |  |  |
|---|---|---|---|---|---|---|---|---|---|
|  |  |  |  |  |  |  |  | -12.0000 | 0 0 0 0 0 0 0 |
|  |  |  |  |  |  |  |  | 0 | 0 0 0 0 0 0 0 |
|  |  |  |  |  |  |  |  | 24.0000 | 0 0 0 0 0 0 |
|  |  |  |  |  |  |  |  | 12.0000 |  |
|  |  |  |  |  |  |  | 52.0000 |  |  |
|  |  |  |  |  |  |  | 38.0000 |  |  |
|  |  |  |  |  |  | 66.0000 |  |  |  |
|  |  |  |  |  |  | 59.0000 |  |  |  |
|  |  |  |  |  | 77.0000 |  |  |  |  |
|  |  |  |  |  | 71.5000 |  |  |  |  |
|  |  |  |  | 87.0000 |  |  |  |  |  |
|  |  |  |  | 82.0000 |  |  |  |  |  |
|  |  |  | 81.0000 |  |  |  |  |  |  |
|  |  |  | 84.0000 | ← 304 |  |  |  |  |  |
|  |  |  | 83.0000 |  |  |  |  |  |  |
|  |  | -2.0000 |  |  |  |  |  |  |  |
|  |  | 39.0000 |  |  |  |  |  |  |  |
|  |  | 61.7500 |  |  |  |  |  |  |  |
| -29.0000 |  |  |  |  |  |  |  |  |  |
| -17.0000 |  |  |  |  |  |  |  |  |  |
| -16.0000 |  |  |  |  |  |  |  |  |  |
| -14.0000 |  |  |  |  |  |  |  |  |  |
| -12.0000 |  |  |  |  |  |  |  |  |  |
| -12.0000 |  |  |  |  |  |  |  |  |  |
| -12.0000 |  |  |  |  |  |  |  |  |  |
| -12.0000 |  |  |  |  |  |  |  |  |  |

FIG. 9

ROLLING INTRA PREDICTION FOR IMAGE AND VIDEO CODING

FIELD

The present application generally relates to data compression and, in particular, to methods and devices for intra prediction in image and video coding.

BACKGROUND

Data compression is used in communications and computer networking to store, transmit, and reproduce information efficiently. It finds particular application in the encoding of images, audio and video. Common image compression formats include JPEG, TIFF, and PNG. A newly-developed video coding standard is the ITU-T H.265/HEVC standard. Other video coding formats include the VP8 and VP9 formats developed by Google Inc. Evolutions to all of these standards and formats are under active development.

All of these image and video coding standards and formats are based on predictive coding that create a prediction of data to be coded, then encode the error in the prediction (often called the residual) for transmission to a decoder as a bitstream. The decoder then makes the same prediction and adjusts it by the reconstructed error decoded from the bitstream. The data compression of the error at the encoder often includes a spectral transform of the error to create blocks of transform domain coefficients. This is typically accompanied by lossy quantization. The reverse operations are performed at the decoder to reconstruct the error/residual. Entropy coding (often context-adaptive) is typically used to encode the residual data, plus side information for making the predictions (e.g. intra-coding mode or inter-coding motion vectors), to generate a bitstream for transmission from encoder to decoder or for storage on a storage medium for later decoding. In some cases, the error at the encoder is encoded without using a spectral transform and/or quantization.

Intra prediction relies on spatial redundancy. Most existing intra prediction schemes rely on the concept of linear displacement; that is, the prediction has a "direction" such that pixels along a vector (the prediction direction) will be predicted using one or more neighboring reconstructed pixels that are wholly or partly intersected by the vector. In HEVC 33 directions are defined as (angular) intra prediction modes (2-34), in addition to planar intra prediction (mode 0) and DC prediction (mode 1). However, linear displacement-based spatial prediction reliant upon neighboring previously-reconstructed pixels may not be the most efficient or effective mechanism for performing intra prediction.

BRIEF DESCRIPTION OF THE DRAWINGS

Reference will now be made, by way of example, to the accompanying drawings which show example embodiments of the present application, and in which:

FIG. 9 illustrates partially completed construction of the work block for generating the predicted block in the example;

Similar reference numerals may have been used in different figures to denote similar components.

DESCRIPTION OF EXAMPLE EMBODIMENTS

Figure 1:
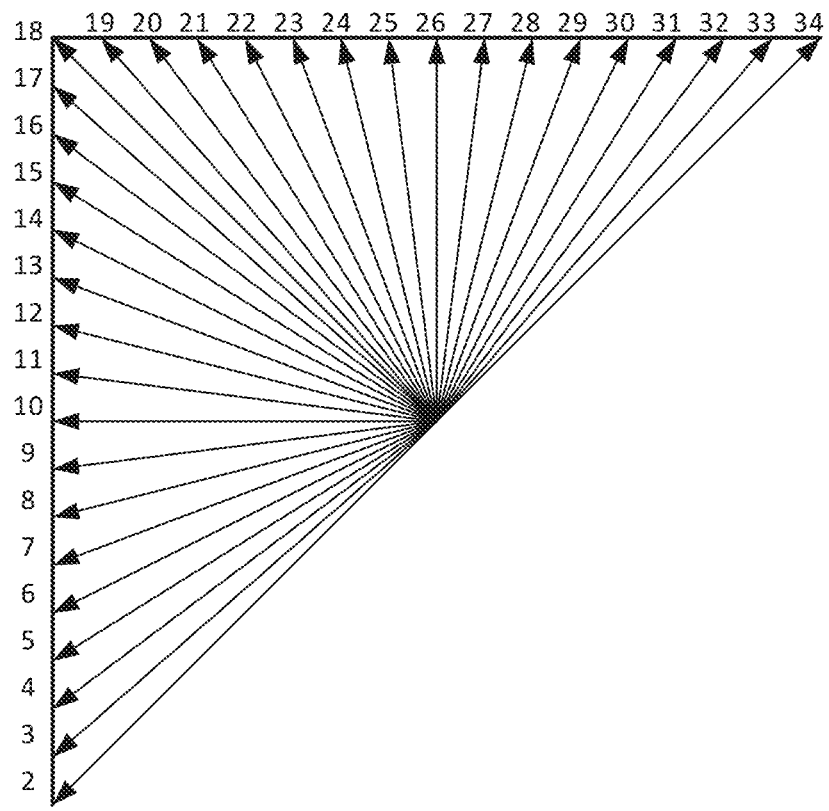
FIG. 1 illustrates the 33 angular intra-coding modes from HEVC, plus one planar mode and one DC mode.

The present application describes methods and encoders/decoders for encoding and decoding images and/or video.

In a first aspect, the present application describes a method of decoding an image in a video or image decoder from a bitstream. The method includes decoding a mode from the bitstream for a current block, the current block having a plurality of neighboring reference samples from an adjacent block, wherein the mode is associated with a prediction function; constructing a predicted block of predicted pixels for the current block, wherein constructing includes initially determining at least some of the predicted pixels based on the prediction function with one or more of the neighboring reference samples as inputs to the prediction function, and determining at least some other of the predicted pixels based on the prediction function with the at least some of the predicted pixels as inputs; decoding residual data to create a reconstructed residual block for the current block; and reconstructing the current block as the sum of the predicted block and the reconstructed residual block.

In another aspect, the present application describes a method of encoding an image in a video or image encoder to produce a bitstream. The method includes selecting a mode for a current block, the current block having a plurality of neighboring reference samples from an adjacent block, wherein the mode is associated with a prediction function; constructing a predicted block of predicted pixels for the current block, wherein constructing includes initially determining at least some of the predicted pixels based on the prediction function with one or more of the neighboring reference samples as inputs to the prediction function, and determining at least some other of the predicted pixels based on the prediction function with the at least some of the predicted pixels as inputs; determining residual data as the difference between the current block and the predicted block; and encoding the residual data and the selected mode for output as a portion of the bitstream.

In a further aspect, the present application describes encoders and decoders configured to implement such methods of encoding and decoding.

In yet a further aspect, the present application describes non-transitory computer-readable media storing computer-executable program instructions which, when executed, configure a processor to perform the described methods of encoding and/or decoding.

Other aspects and features of the present application will be understood by those of ordinary skill in the art from a review of the following description of examples in conjunction with the accompanying figures.

It will be understood that some aspects of the present application are not limited to either image or video coding and may be applied to general data compression in some embodiments.

In the description that follows, some example embodiments are described with reference to the H.264/AVC standard for video coding, the H.265/HEVC standard, the VP8 format, the VP9 format, or others. Those ordinarily skilled in the art will understand that the present application is not limited to those video coding standards and formats but may be applicable to other video coding/decoding standards and formats, including possible future standards, multi-view coding standards, scalable video coding standards, 3D video coding standards, and reconfigurable video coding standards. Similarly, to the extent that reference is made to particular image coding standards and formats, it will be appreciated that the processes and devices described may be implemented in connection with other standards, including future standards In the description that follows, when referring to video or images the terms frame, picture, slice, tile, quantization group, and rectangular slice group may be used somewhat interchangeably. Those of skill in the art will appreciate that a picture or frame may contain one or more slices or segments. A series of frames/pictures may be called a "sequence" in some cases. Other terms may be used in other video or image coding standards. It will also be appreciated that certain encoding/decoding operations might be performed on a frame-by-frame basis, some are performed on a slice-by-slice basis, some picture-by-picture, some tile-by-tile, and some by rectangular slice group, etc., depending on the particular requirements or terminology of the applicable image or video coding standard. In any particular embodiment, the applicable image or video coding standard may determine whether the operations described below are performed in connection with frames and/or slices and/or pictures and/or tiles and/or rectangular slice groups, etc., as the case may be. Accordingly, those ordinarily skilled in the art will understand, in light of the present disclosure, whether particular operations or processes described herein and particular references to frames, slices, pictures, tiles, rectangular slice groups are applicable to frames, slices, pictures, tiles, rectangular slice groups, or some or all of those for a given embodiment. This also applies to coding tree units, coding units, prediction units, transform units, quantization groups, etc., as will become apparent in light of the description below.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Modern image and video coding processes almost all rely upon predictive coding to compress the image data. Block-based predictive coding involves partitioning the image into a plurality of blocks (often square or rectangular, and possibly of varying sizes) and encoding the data block-by-block. To compress the data, rather than encoding the raw pixel data, a prediction of the block is generated and the difference (termed the error or residual) between the original block and the predicted block is encoded. Encoding typically involves the spectral transform of the residual data, the quantization of the transform coefficients, and the entropy encoding of the quantized transform coefficients in accordance with whatever binarization and coding scheme is being used for a given case.

The creation of a predicted block is often either created through inter prediction (e.g. relying upon pixel data in a previously-reconstructed picture in a sequence of pictures) or intra prediction (e.g. relying upon previously-reconstructed pixel data in the same picture as the current block). As such, inter prediction aims at exploiting temporal redundancy between pictures, and intra prediction aims at exploiting spatial redundancy within a picture.

Spatial redundancy refers to the inherent characteristic of a picture where a pixel is often similar in value to some of its neighbors. In a typical image, there can be strong directionality to spatial redundancy, particularly along an edge or line. For this reason, many intra-coding processes use directional prediction. In HEVC, 35 intra-coding modes are specified, among which 33 modes define angular (directional) prediction, i.e. each of these 33 modes has an associated direction. Reference is now made to FIG. 1, which illustrates the 33 angular intra-coding modes from HEVC, plus one planar mode and one DC mode.

Figure 2:
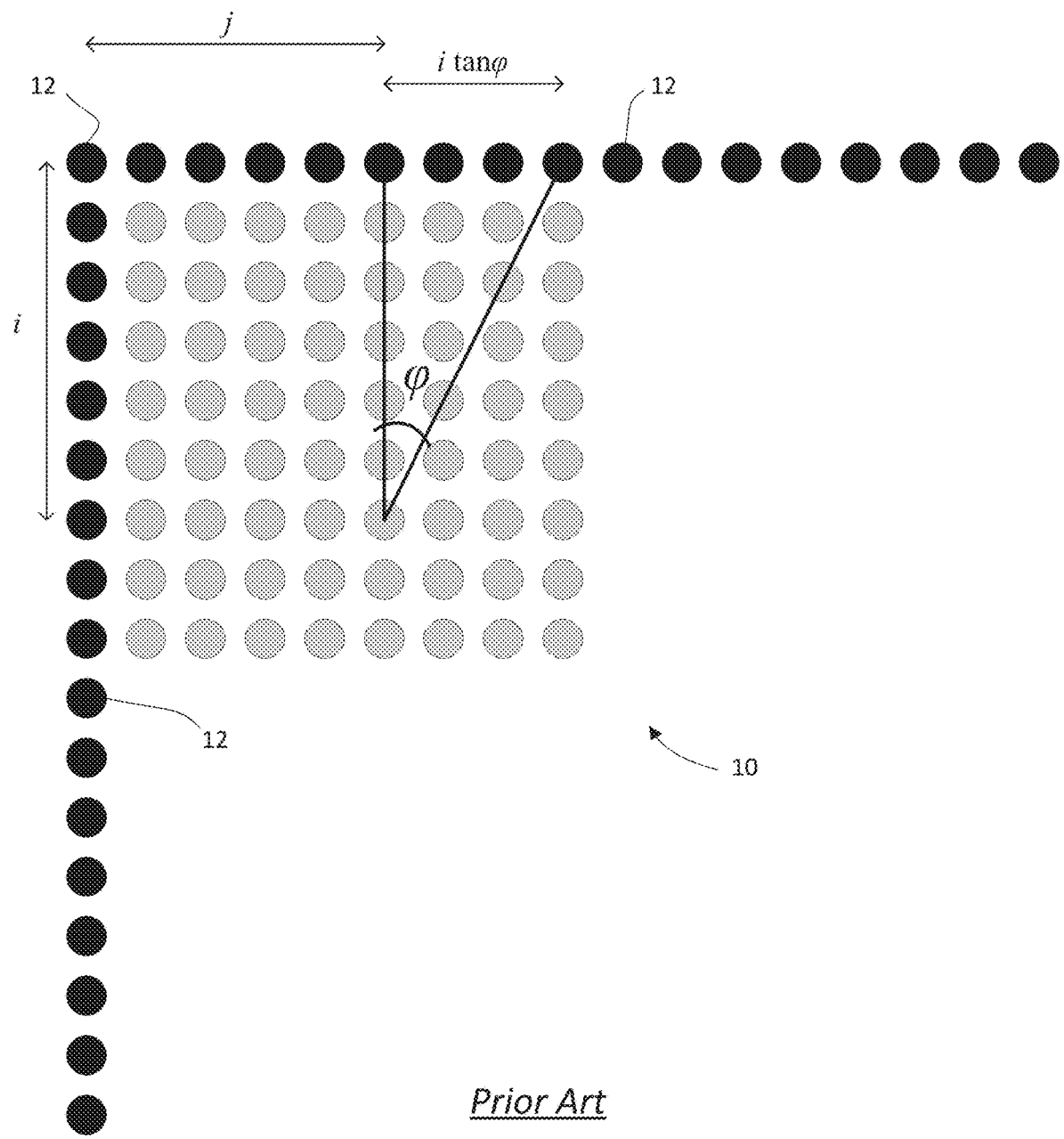
FIG. 2 illustrates an example application of directional prediction in creation of an 8×8 predicted block.

FIG. 2 illustrates an example application of directional prediction in creation of an 8×8 predicted block 10. The previously-reconstructed neighboring pixels (or, more generically, the "reference samples" 12 since the reconstructed pixels may have been subjected to some type of post-reconstruction filtering) are shown extending in a row across the top of the predicted block and in a column down the left side of the predicted block. These reference samples 12 are pixels from the bottom row and right column, respectively, of neighboring previously-reconstructed blocks adjacent to the current block to-be-reconstructed. The predicted pixels of the 8×8 predicted block 10 are generated based on a linear displacement of one or more of the reference samples 12 at angle $\varphi$. That is, a predicted pixel in the 8×8 block 10 is predicted by tracing a line at an angle ($\varphi$) from the pixel position to the point where it intersects with either the top row or the left column of reference samples 12. In some implementations, when the intersection falls on integer positions, the value of the references sample 12 at the intersection is used as the value of the predicted pixel; otherwise when the intersection falls at a fractional position between two references samples 12, the sample value at the intersection is interpolated by using the two neighboring reference samples 12. In other words, the top row and the left most column may be interpolated to provide samples at fractional positions for the purpose of generating predictions. However, all of the predicted pixels of the predicted block 10 are generated based on the reference samples 12 from neighboring previously-reconstructed blocks.

In general, this approach to intra prediction works well for image blocks with sharp edges and a small absolute directional derivative at a given angle. However, due to its design, directional prediction may introduce discontinuity along the direction that is perpendicular to the given angle. Since such discontinuity is introduced by the prediction process and is generally not present in the original image, it needs to be compensated in the residual block. When the residual block is transformed (e.g. by discrete cosine transform (DCT)) and quantized, discontinuity in the block translates into non-zero coefficients at medium or high frequency positions. Unfortunately, non-zero coefficients that are not close to the DC position are difficult to code by using the entropy coding method in existing video coding standards like HEVC and AVC, which typically assumes that most non-zero coefficients are concentrated in the low-frequency region.

The present application describes a modified intra prediction process that may reduce the likelihood of such discontinuities. Advantageously, some embodiments of the below-described modified intra prediction process are independent of the reconstruction of the corresponding residual block at the decoder. Such independency allows for parallel processing of prediction generation and residual block reconstruction.

In one aspect, the present application describes an intra prediction process in which predicted pixels of a predicted block are themselves used as the basis for generating other predicted pixels of that same predicted block. This may be termed "rolling prediction" or "rolling intra prediction" in the present description. With respect to those pixels of a predicted block that are generated based on other predicted pixels of the same predicted block, that portion of the process of generating a prediction block in the proposed solution may be performed, on the decoder side, independently of and in parallel to the process of decoding and reconstructing the corresponding residual block. The proposed solution may be used in conjunction with existing solutions by providing additional, complementary prediction modes or used standalone as complete replacement in place of existing solutions. Experimental results on standard test images have shown that the proposed solution provides improvement in BD-rate ranging from 1% to 8% over a comparable existing solution based on directional intra prediction.

Figure 3:
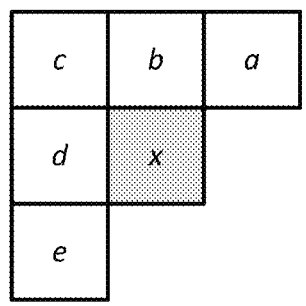
FIG. 3 diagrammatically shows a to-be-predicted pixel x and a template of five neighboring pixel positions.

Reference is now made to FIG. 3, which diagrammatically shows a to-be-predicted pixel x and five neighboring pixel positions, a, b, c, d, and e. In some instances, the pixel positions a, b, c, d, and e shown in FIG. 3 may be referred to as a "template" 20 defining the positions of these pixels relative to pixel x. This example template 20 include five neighboring pixels, but other example templates may include more or fewer nearby or neighboring pixels. This example template 20 is also biased to include pixels above and to the left of the to-be-predicted pixel x; however, other templates may be arranged to include pixels in other locations. For example, if a prediction order were to progress from bottom right to top left, then the template may be positioned so as to include pixels below and to the right of the to-be-predicted pixel x.

The nearby or neighboring pixels a, b, c, d, and e may be used in generating a prediction for pixel x. To generate the prediction, a prediction function $f_m$ may be used. The prediction function $f_m(a,b,c,d,e)$ receives, as inputs, one or more of the pixels from the template 20. The prediction function $f_m$ can be any function from $\mathbb{R}^5$ to $\mathbb{R}$, where $\mathbb{R}$ denotes the set of real numbers. The prediction function $f_m(a,b,c,d,e)$ may be given by:

$$f_m(a, b, c, d, e) = (w_a w_b w_c w_d w_e) \begin{pmatrix} a \\ b \\ c \\ d \\ e \end{pmatrix}$$

where the weighting factor $(w_a\ w_b\ w_c\ w_d\ w_e)$ is a row vector of real numbers. Some (non-limiting) example prediction functions include:

$$f_m(a,b,c,d,e)=a$$

$$f_m(a,b,c,d,e)=b$$

$$f_m(a,b,c,d,e)=c$$

$$f_m(a,b,c,d,e)=d$$

$$f_m(a,b,c,d,e)=e$$

$$f_m(a,b,c,d,e)=b+d-c$$

$$f_m(a,b,c,d,e)=\rho*a+(1-\rho)*b$$

$$f_m(a,b,c,d,e)=\rho*b+(1-\rho)*c$$

$$f_m(a,b,c,d,e)=\rho*c+(1-\rho)*d$$

$$f_m(a,b,c,d,e)=\rho*d+(1-\rho)*e$$

In the above, $0<\rho<1$ is a real number. The above are merely examples. Other prediction functions could be used. It will also be appreciated that although the above examples are linear functions the present application is not necessarily limited to linear prediction functions.

It will also be appreciated that the template and prediction function $f_m$ may be made to correspond to conventional directional prediction modes when determining some pixels of the first (top) row or first (left) column of the predicted block, in that they will use a weighted combination of one or more of the neighboring previously-reconstructed pixels (reference samples) in positions a, b, c, d, or e as the input to the function.

Figure 4A:
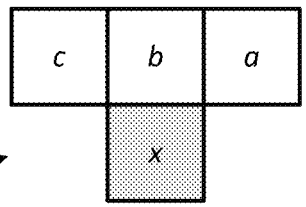
FIGS. 4A-4D show other example templates.

Reference is now made to FIGS. 4A to 4D, which show other example templates identifying neighboring pixel positions to be used in determining a predicted pixel x. For example, FIG. 4A, shows a template 22 that includes positions a, b, and c, in the row directly above the pixel to be predicted. In this example, the positions available for inclusion as inputs to the prediction function $f_m$ are a subset of those available in the example shown in FIG. 3. It will be appreciated, that any functions realizable with respect to template 22 are also realizable with respect to template 20 (FIG. 3), since pixel positions a, b, and c are available in both examples.

Figure 4B:
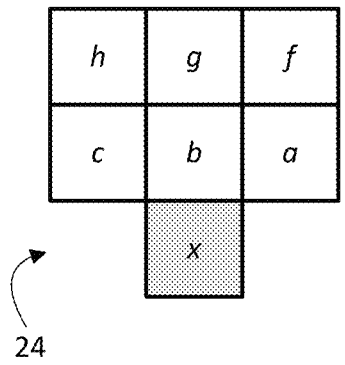
Figure 4C:
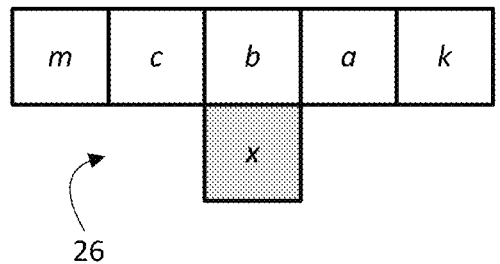

FIG. 4B shows another example template 24 in which additional pixel positions f, g and h are included as possible inputs to the prediction function $f_m$. This template 24 is biased towards inputs from above the pixel to be predicted. FIG. 4C shows an example template 26 that includes additional pixel positions m and k from the row immediately above the pixel to be predicted. It will be appreciated that the templates shown in FIGS. 4A, 4B and 4C are biased towards using pixels above the pixel to be predicted. In other embodiments, templates may be biased toward using pixels to the left, right or below. The suitability of a particular template will depend, in many implementations, on the traversing order used in generating the predicted pixels, which will be discussed further below.

Figure 4D:
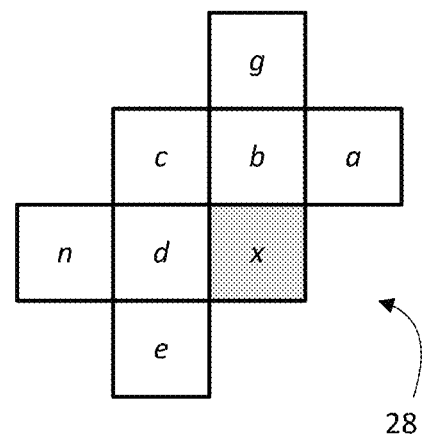

FIG. 4D shows an example template 28 similar to the template 20 (FIG. 3) but including pixel positions g and n, spaced two pixel positions away from the pixel to be predicted in the vertical and horizontal directions, respectively.

It will be appreciated that the templates do not determine the predicted pixel, but determine which pixel positions are available for use as inputs to a prediction function $f_m$. In the general case, the template may include all surrounding pixels in all directions. In some implementations, the encoder and decoder may use the smallest template that includes all neighboring pixels needed to define all desired prediction modes (prediction functions). Further note that different templates may be used under different situations, e.g. for different color (luma, chroma) components or for different picture resolutions (480p, 720p, 1080p, 4K, etc.). Since a larger template is often associated with higher complexity in storage and computation, the present process may adjust the computational complexity by using a template suited for a certain situation.

Figure 5:
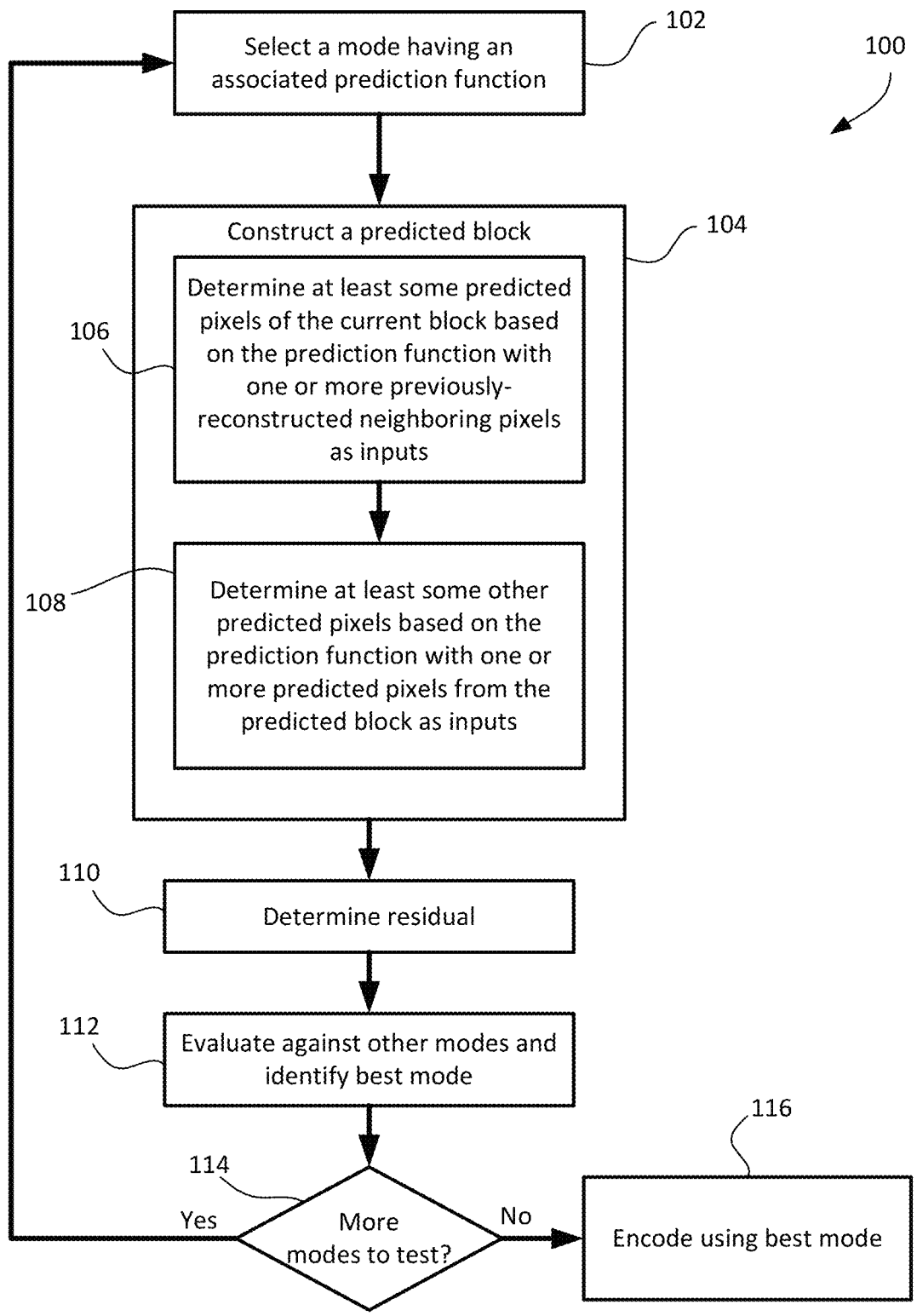
FIG. 5 shows, in flowchart form, one example process for encoding an image or video using rolling intra prediction.

Reference is now made to FIG. 5, which shows, in flowchart form, one example process 100 for encoding an image or video using rolling intra prediction. The image or video includes a picture partitioned into blocks and the coding process involves predictive intra coding. For a current block, the process 100 obtains a predicted block, subtracts the predicted block from the original block from the picture to obtain a residual block, and the residual block is then encoded (typically, it is transformed, quantized, and entropy encoded) together with side information such as the mode m selected for prediction. For the purposes of this example, the traversing order in which the prediction block is constructed is assumed to be horizontal raster scan order; that is, starting from the top left and progressing rightwards across each row in turn.

The process 100 includes selecting a mode m in operation 102. The mode m has an associated prediction function $f_m$. The mode m may be selected from among a plurality of predefined modes. The selection of the mode may be based on an incremented index value that works through all of the available modes in the process of determining which mode is optimal for a given block, picture, etc. In some cases, the selection may be made based on other side information, such as the mode used for neighboring blocks, for a previously coded slice, picture, or sequence, or based on statistics of the block. In some cases, the available modes may be reduced to a subset of available modes based on side information.

In operation 104, the encoder constructs a predicted block as a prediction of the current block. The predicted block is constructed using rolling prediction, i.e. at least some of the predicted pixels are generated based on a prediction function that uses other predicted pixels of the predicted block as inputs.

Operation 104 may be conceptually considered as two operations: operation 106 in which some of the predicted pixels are determined from the prediction function using neighboring previously-reconstructed pixels (reference samples) as inputs, and operation 108 in which some other predicted pixels are determined from the prediction function using one or more predicted pixels from the predicted block as inputs.

The situations in which reference samples are used in the function depends on the position of the pixel being predicted and the function itself. Operation 106 occurs in many cases in predicting the pixels of the first (top) row of pixels of the predicted block (since there are no or few predicted pixels to serve as inputs), particularly if the function selects pixels above the pixel to be predicted as inputs. In the case of the first predicted pixel (e.g. the top left pixel in the predicted block), all of the inputs will be "reference samples", e.g. previously-reconstructed pixels (reference samples) from neighboring blocks (assuming a horizontal raster scan traversing order and a causal prediction function $f_m$). Use of reference samples as at least some portion of the input to the prediction function may also occur each time a pixel in the first column is predicted, if the function selects pixels located to the left of the pixel to be predicted. As construction of the predicted block proceeds to the right and downwards, fewer or no reference samples may be involved as inputs to the prediction function and some or all of the inputs may be neighboring predicted pixels from within the predicted block itself, as indicated by operation 108.

Once the predicted block has been constructed using rolling intra prediction, then in operation 110 the residual block is determined by subtracting the predicted block from the original block.

In operation 112, the encoder may evaluate the selected mode m against other modes to determine whether the selected mode m is the best mode. This may include, in some implementations, using a rate-distortion optimization calculation to assess the efficacy of the selected mode and to numerically compare it against other modes previously tested for the current block. The distortion calculation may involve encoding, decoding and reconstructing the current block based on the selected mode m to assess the level of distortion.

In operation 114, if there are other candidate modes to test, then the encoder returns to operation 102 to select another mode for evaluation. If not, then in operation 116 the "best mode" identified is encoded and used to actually encode the current block. The encoded data forms part of the bitstream of encoded data output by the encoder from encoding the image or video.

Figure 6:
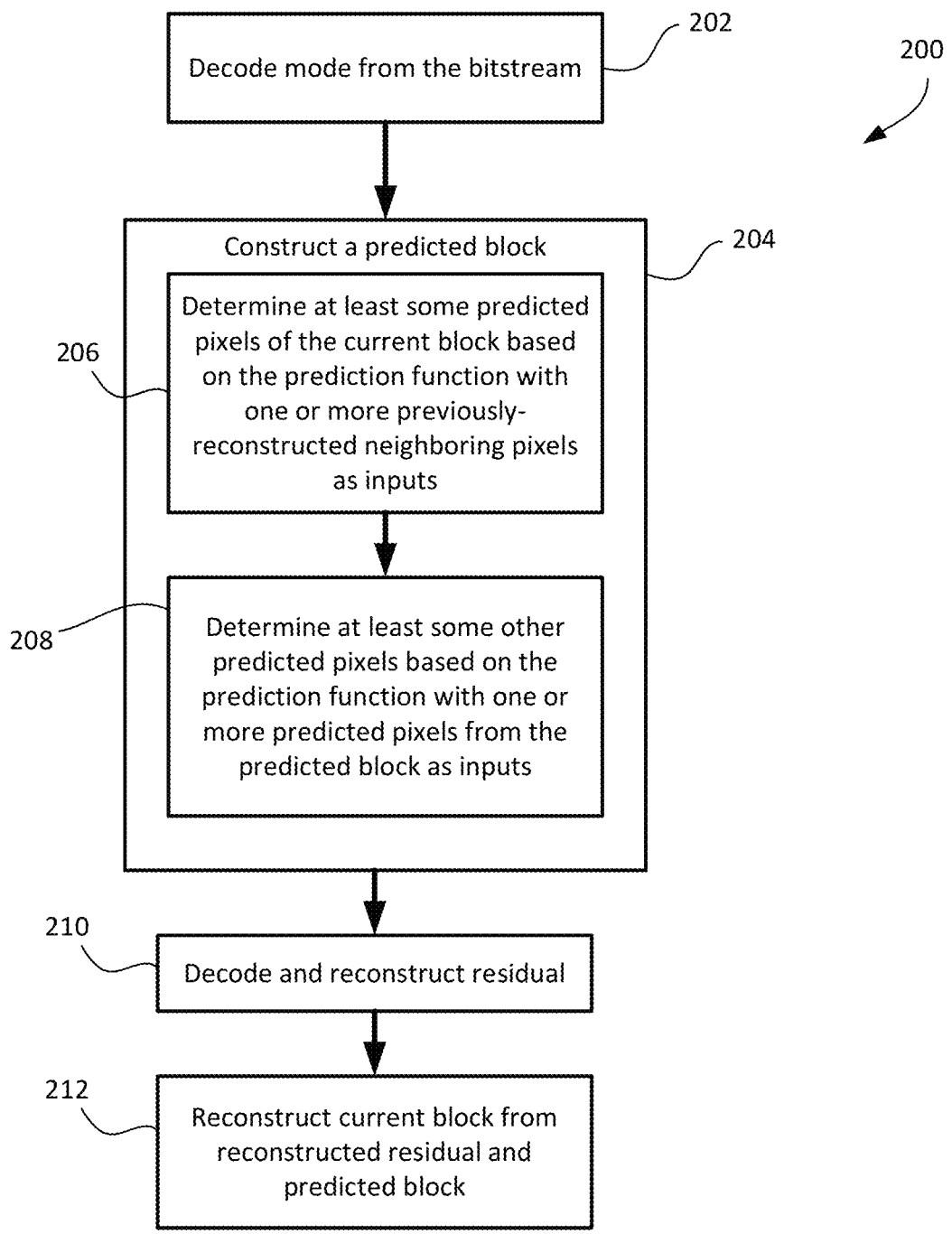
FIG. 6 shows, in flowchart form, an example process for decoding an image or video using rolling intra prediction.

Reference will now be made to FIG. 6, which shows, in flowchart form, one example process 200 for decoding an encoded image or video using rolling intra prediction. The process 200 includes decoding a mode m from the bitstream in operation 202. The mode m may be indicated by a mode index or other selection data, e.g. in a header associated with the prediction block. In some cases, the mode m (or index indicating the mode) may be differentially coded and/or conditionally coded with respect to a previously-used mode. Howsoever implemented, the mode m to be used for intra coding of the current block is determined by the decoder in operation 202.

In operation 204, the prediction block for predicting the current block is constructed using rolling intra prediction in accordance with the mode m determined in operation 202. As noted above, the construction of the prediction block involves determining the predicted pixels of the predicted block in accordance with the prediction function associated with the mode m. The prediction function receives, as inputs, one or more neighboring pixels to the pixel to be predicted. As indicated by operations 206 and 208, respectively, the prediction function may initially use one or more reference samples from neighboring previously-reconstructed blocks as it determines predicted pixels, particularly near the first corner/row/column to be constructed, and then as the construction progresses the prediction function will use one or more predicted pixels from the predicted block as inputs for determining other predicted pixels of the predicted block.

Once the predicted block is constructed, the residual block is reconstructed by decoding the bitstream of encoded data to obtain quantized transform coefficients, which are then inverse quantized and inverse transformed to obtain the reconstructed residuals, as indicated by operation 210. It will be appreciated that this operation may occur before operation 204, after operation 204, or in parallel with operation 204, in some embodiments.

In operation 212, the current block is reconstructed by adding the predicted block and the reconstructed residual block.

It will be appreciated that certain operations in the described processes may be performed in a different order, or may be performed partly or wholly in parallel with other operations, depending on the implementation.

In the case of both encoding and decoding, the prediction block is constructed one predicted pixel at a time and the process uses predicted pixels to generate subsequent pixels in the block. Accordingly, the order in which pixels are determined (the "traversing order") may be of significance. Though mathematically a traversing order is similar to a scanning order for entropy coding (e.g. in HEVC [2]) in converting 2D (two-dimensional) data blocks into 1D (one-dimensional) sequences, they serve different purposes: a traversing order is used to generate a prediction in pixel domain, whereas a scanning order is used to determine the sequence (order) of (quantized) coefficients for entropy coding (in transform domain with a transform or in pixel domain without a transform).

As noted above, one possible traversing order is a horizontal raster scan order. Other traversing orders may be used in other embodiments, such as, for example, vertical raster scan (e.g. raster scan after transpose), Peano-Hilbert order, or Morton order (Z-order).

Different traversing orders might impact the availability of neighbouring pixels (e.g. a,b,c,d,e) of a particular pixel x. Thus, the traversing order to be used to generate prediction for an image block might be chosen according to the prediction mode m. For example, if the mode m defines a downward left prediction direction (i.e. it draws upon pixels located above and to the right of the pixel to be predicted), one might use inverted raster order from right to left; and if the mode m defines a downward right prediction direction (i.e. it draws upon pixels located above and to the left of the pixel to be predicted), one might use raster order from left to right.

Furthermore, since the availability of neighbouring pixels of a particular pixel x might depend upon the traversing order selected, the template used to generate prediction for pixel x might be selected according to the traversing order. For example, the template shown in FIG. 3 might be used for raster order from left to right, the following template might be used for raster order from right to left;

| c | b | a |
|---|---|---|
|   | x | h |
|   |   | g | and the following template might be used for vertical traversing order from bottom to top and from left to right.

| c |   |   |
|---|---|---|
| d | x |   |
| e | f | g |

Other combinations of traversing orders and templates, including templates of different sizes, are possible. In some cases, it is possible to limit the selection of traversing orders to a finite set and to select a template that is invariant for all the traversing orders in the set. For example, the template in FIG. 3 might be used for a set of traversing orders including the traditional raster order (from left to right) and vertical traversing order from top to bottom and from left to right.

Similarly, the template including a, b, c, h, g above might be used for a set of traversing orders including raster order from right to left and vertical traversing order from top to bottom and from right to left.

In a picture with more than one color component, e.g. luma and chroma components, a unit of pixels consists of co-located blocks of pixels from these components. In cases where different prediction modes may be used for blocks of pixels from different color components in the same unit, different traversing orders may be used correspondingly for these blocks of pixels from different color components, e.g. one traversing order for the luma block and another one for both chroma blocks, or three orders for the three luma and chroma blocks, respectively.

In some implementations, the prediction process may define a "work block" in the course of building a predicted block. The work block, designated $\tilde{x}$, may be used to store a row and/or column of reference samples and to store intermediate prediction results, some of which may not appear in the end resulting prediction block, depending on the prediction "direction" that results from the mode m.

Figures 7, 8:
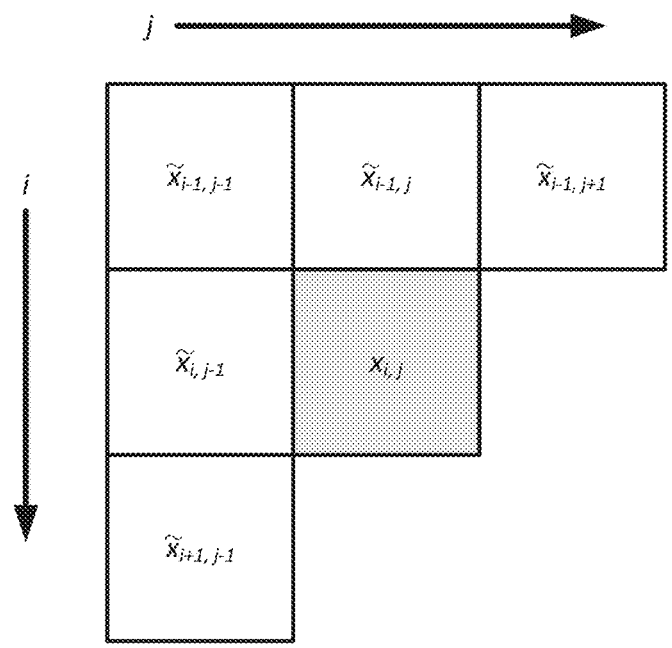
FIG. 7 shows a portion of a "work block" used in an example implementation of rolling intra prediction.
FIG. 8 illustrates a set of reference samples and the current block samples for an example application of rolling intra prediction.

Reference is now made to FIG. 7, which shows a portion of a "work block" using an inverted L-shaped template. Pixel locations are indexed by i, j. The pixel $x_{i,j}$ to be predicted will result in predicted pixel $p_{i,j}$, and the prediction function draws upon one or more of the work block locations $\{\tilde{x}_{i-1,j+1}, \tilde{x}_{i-1,j}, \tilde{x}_{i-1,j-1}, \tilde{x}_{i,j-1}, \tilde{x}_{i+1,j-1}\}$ in the template. Each predicted pixel $p_{i,j}$ is fed back into the loop by setting $\tilde{x}_{i,j} = p_{i,j}$ so that $p_{i,j}$ may be used to generate prediction of subsequent pixels in the block.

Note that in cases when some of $\{\tilde{x}_{i-1,j+1}, \tilde{x}_{i-1,j}, \tilde{x}_{i-1,j-1}, \tilde{x}_{i,j-1}, \tilde{x}_{i+1,j-1}\}$ are referenced in the prediction function, but are not reference samples and are not yet updated with prediction values generated previously, fill-in values may be used that are either derived from the updated neighbourhood or some default values. The process used to derive a fill-in value or the default values are known both to the encoder and the decoder to ensure that the prediction generated at the encoder is the same as the prediction generated the decoder.

An example process to derive a fill-in value is to use the nearest available (updated) neighbour. For example, $\tilde{x}_{i+1,j-1}$ if is not yet available, one can use $\tilde{x}_{i,j-1}$ or $\tilde{x}_{i+1,j-2}$ (if $\tilde{x}_{i+1,j-1}$ is at the first column of the prediction block to be generated) as the fill-in value for $\tilde{x}_{i+1,j-1}$.

As an illustrative example, consider that the current block x is an M×N block for which a predicted block is to be constructed, where M and N are positive integers. An example rolling intra prediction process at the encoder is:

Step 1: Initialize an (M + 2) × (2N + 1) block $\tilde{x}$ such that
$\tilde{x}_{0,j}$, j = 0,...,2N, and $\tilde{x}_{i,0}$, i = 1,...,M + 1, are reference samples obtained from previously reconstructed pixels; and $\tilde{x}_{i,j}$ is initialized to be 0 for all the remaining (i, j), i.e. i > 0 and j > 0.

Step 2: For each m in a finite set of available modes, do the following:
for i=1,...,M
  for j=1,...,2N−i
    $p_{i,j}^{(m)} = f_m(\tilde{x}_{i-1,j+1}, \tilde{x}_{i-1,j}, \tilde{x}_{i-1,j-1}, \tilde{x}_{i,j-1}, \tilde{x}_{i+1,j-1})$
    $\tilde{x}_{i,j} = p_{i,j}^{(m)}$
  end
end Step 3: Select the mode m* such that $\{p_{i,j}^{(m^*)}; 1 \le i \le M, 1 \le j \le N\}$ gives the best compression performance (e.g. rate distortion cost, MSE, MAE, ...).

Step 4: Encode m* and e = x − $p^{(m^*)}$, where $e_{i,j} = x_{i,j} - p_{i,j}^{(m^*)}$.

In Step 2 above, j=1, ..., 2N−i can be replaced by j=1, ..., N if the mode m does not use $\tilde{x}_{i-1,j+1}$ in $f_m$, i.e., $f_m(0, b, c, d, e) = f(a,b,c,d,e)$ for all a. Alternatively, both Step 1 and Step 2 may be inside the loop over available modes indexed by m. In this case, the shape and/or size of $\tilde{x}$ may be dependent upon m.

Also in Step 2 above, if $\tilde{x}_{i+1,j-1}$ is not available due to traversing order, it can be filled in by $\tilde{x}_{i,j-1}$.

A corresponding example decoding process for creating a reconstructed block $\hat{x}$ may be given by:

---

Step 1: Initialize an (M + 2) × (2N + 1) block $\tilde{x}$ such that
 $\tilde{x}_{0,j}$, j = 0 ,...,2N , and $\tilde{x}_{i,0}$, i = 0,...,M + 1, are reference samples obtained from previously reconstructed pixels.
 $\tilde{x}_{i,j}$ is initialized to be 0 for all the remaining (i, j), i.e. i > 0 and j > 0.
Step 2: Decode the mode m* for the block $\hat{x}$.
Step 3: Do the following
  for i=1,...,M
   for j=1,...,2N−i
    $p_{i,j}^{(m^*)} = f_{m^*}(\tilde{x}_{i-1,j+1}, \tilde{x}_{i-1,j}, \tilde{x}_{i-1,j-1}, \tilde{x}_{i,j-1}, \tilde{x}_{i+1,j-1})$
    $\tilde{x}_{i,j} = p_{i,j}^{(m^*)}$
   end
  end
Step 4: Decode and reconstruct the residual block $\hat{e}$.
Step 5: Reconstruct $\hat{x}$ as $p^{(m^*)} + \hat{e}$.

---

In Step 3 above, j=1, . . . , 2N−i can be replaced by j=1, . . . , N if the mode m* does not use $\tilde{x}_{i-1,j+1}$ in $f_m^*$, i.e., $f_m^*(0, b, c, d, e) = f(a,b,c,d,e)$ for all a. Alternatively, the order of Step 1 and Step 2 may be switched. In this case, the shape and/or size of $\tilde{x}$ may be dependent upon m*.

Also in Step 3 above, if $\tilde{x}_{i+1,j-1}$ is not available due to traversing order, it can be filled in by $\tilde{x}_{i,j-1}$.

It will be appreciated that the work block is oversized compared to the block to be predicted. This is a function of the size of the block to be predicted and the prediction function, or a function of the size of the block to be predicted and the size of the template used to define the prediction. In this case, it results in building a work block of size (M+2)×(2N+1), although it will be understood that not all positions in the work block will be calculated, as indicated by the for-loop: for j=1, . . . , 2N−i.

One way to initialize a work block $\tilde{x}$ for an N×N block to be predicted is to construct $\tilde{x}$ as an (N+2)×(2N+1) block as follows:

C1. $\tilde{x}_{0,j}$, j=0, . . . , 2N, and $\tilde{x}_{i,0}$, i=1, . . . , N+1, are reference samples obtained from previously reconstructed pixels. For example, suppose that the block to be predicted is at position (s, t) in a picture, that is, (s, t) is the starting (top-left) position of the block. Then, $\tilde{x}_{0,j} = \hat{x}_{s-1,t-1+j}$, j=0, . . . , 2N, where $\hat{x}_{k,l}$ denotes the reconstructed pixel at position (k,l) in the picture. Similarly $\tilde{x}_{i,0} = \hat{x}_{s-1+i,t-1}$, i=0, . . . , N+1. If $\hat{x}_{s-1+i,t-1}$ is not available or not yet reconstructed, a default value or a nearest available value in the same row (or column) may be used. In the former case, a default value may be chosen as 128 for 8-bit video, 512 for 10-bit video, a value signalled in the bitstream, or a value derived from a previously reconstructed portion of the picture (e.g. average of that portion). In the latter case, for example, if $\hat{x}_{s+N,t-1}$ is not available, it may be replaced by $\hat{x}_{s+N-1,t-1}$. Similarly, if $\hat{x}_{s-1,t+N}$ is not available, it may be replaced by $\hat{x}_{s-1,t+N-1}$. Note that in some cases, one or more reference samples in $\tilde{x}_{0,0} \ldots \tilde{x}_{0,2N}$ may be obtained from $\hat{x}_{s-1,t-1} \ldots \hat{x}_{s-1,t+2N-1}$ and its reconstructed neighborhood through a filtering process. Similarly, one or more reference samples in $\tilde{x}_{0,0} \ldots \tilde{x}_{N+1,0}$ may be obtained from $\hat{x}_{s-1,t-1} \ldots \hat{x}_{s+N,t-1}$ and its reconstructed neighborhood through a filtering process.

C2. $\tilde{x}_{i,j}$ is initialized to be 0 for all the remaining (i,j), i.e. i>0 and j>0.

Alternatively, the prediction mode m to be used may determine how a work block $\tilde{x}$ is initialized. For example, let $f_m(\tilde{x}_{i-1,j+1}, \tilde{x}_{i-1,j}, \tilde{x}_{i-1,j-1}, \tilde{x}_{i,j-1}, \tilde{x}_{i+1,j-1})$ denote the function used to generate the prediction pixel $p_{i,j}$ at position (i,j). Then, If $f_m(a,b,c,d,e) = f_m(0, b, c, d, e)$ for all possible (a,b,c,d,e), then $\tilde{x}$ is a (N+2)×(N+1) block initialized as follows:
 (a) $\tilde{x}_{0,j}$, j=0, . . . , N, and $\tilde{x}_{i,0}$, i=1, . . . , N+1, are reference samples obtained from previously reconstructed pixels. See Step C1 above.
 (b) $\tilde{x}_{i,j}$ is initialized to be 0 for all the remaining (i,j), i.e. i>0 and j>0.

Otherwise, $\tilde{x}$ is a (N+2)×(2N+1) block initialized as follows:
 (a) $\tilde{x}_{0,j}$, j=0, . . . , 2N, and $\tilde{x}_{i,0}$, i=1, . . . , N+1, are reference samples obtained from previously reconstructed pixels. See Step C1 above.
 (b) $\tilde{x}_{i,j}$ is initialized to be 0 for all the remaining (i,j), i.e. i>0 and j>0.

As a further illustration, below is an example of 18 different prediction functions, i.e. modes m, using the prediction formula:

$$f_m(a, b, c, d, e) = (w_a w_b w_c w_d w_e) \begin{pmatrix} a \\ b \\ c \\ d \\ e \end{pmatrix},$$

where $(a, b, c, d, e) = (\tilde{x}_{i-1,j+1}, \tilde{x}_{i-1,j}, \tilde{x}_{i-1,j-1}, \tilde{x}_{i,j-1}, \tilde{x}_{i+1,j-1})$.

$$(w_a w_b w_c w_d w_e) = \begin{matrix}
[1, & 0, & 0, & 0, & 0; & \%0 \\
0.75, & 0.25, & 0, & 0, & 0; & \%1 \\
0.5, & 0.5, & 0, & 0, & 0; & \\
0.25, & 0.75, & 0, & 0, & 0; & \\
0, & 1, & 0, & 0, & 0; & \\
0, & 0.75, & 0.25, & 0, & 0; & \\
0, & 0.5, & 0.5, & 0, & 0; & \\
0, & 0.25, & 0.75, & 0, & 0; & \\
0, & 0, & 1, & 0, & 0; & \\
0, & 0, & 0.75, & 0.25, & 0; & \\
0, & 0, & 0.5, & 0.5, & 0; & \\
0, & 0, & 0.25, & 0.75, & 0; & \\
0, & 0, & 0, & 1, & 0; & \\
0, & 0, & 0, & 0.75, & 0.25; & \\
0, & 0, & 0, & 0.5, & 0.5; & \\
0, & 0, & 0, & 0.25, & 0.75; & \\
0, & 0, & 0, & 0, & 1; & \%16 \\
0, & 1, & -1, & 1, & 0]; & \%17
\end{matrix}$$

Observe that modes 0-16 generate prediction by interpolating neighboring samples by using a 2-tap filter with filter coefficients (0, 1) or (1, 0) for integer-pel positions, filter coefficients (0.5,0.5) for half-pel positions, and filter coefficients (0.75, 0.25) or (0.25, 0.75) for quarter-pel positions. Further note that mode 17 is not simple interpolation using neighboring pixels, and is defined by $f_{17}(a,b,c,d,e) = b+d-c.$ Continuing with this illustrative example, assume that mode 2 (m=2) of the above example is used to create a prediction for a 4×4 block using a horizontal raster traversing order. In this case, the prediction function is:

$$f_m(\tilde{x}_{i-1,j+1}, \tilde{x}_{i-1,j}, \tilde{x}_{i-1,j-1}, \tilde{x}_{i,j-1}, \tilde{x}_{i+1,j-1}) = 0.5\tilde{x}_{i-1,j+1} + 0.5\tilde{x}_{i-1,j}$$

FIG. 8 shows the example pixel values for the 4×4 block 300 and the pixel values of previously-reconstructed pixels 302 in the neighboring row above and column to the left from adjacent previously-reconstructed blocks.

FIG. 9 shows the work block after $p_{1,1}$ is generated, where $p_{1,1}$ is denoted by reference numeral 304.

Figure 10:
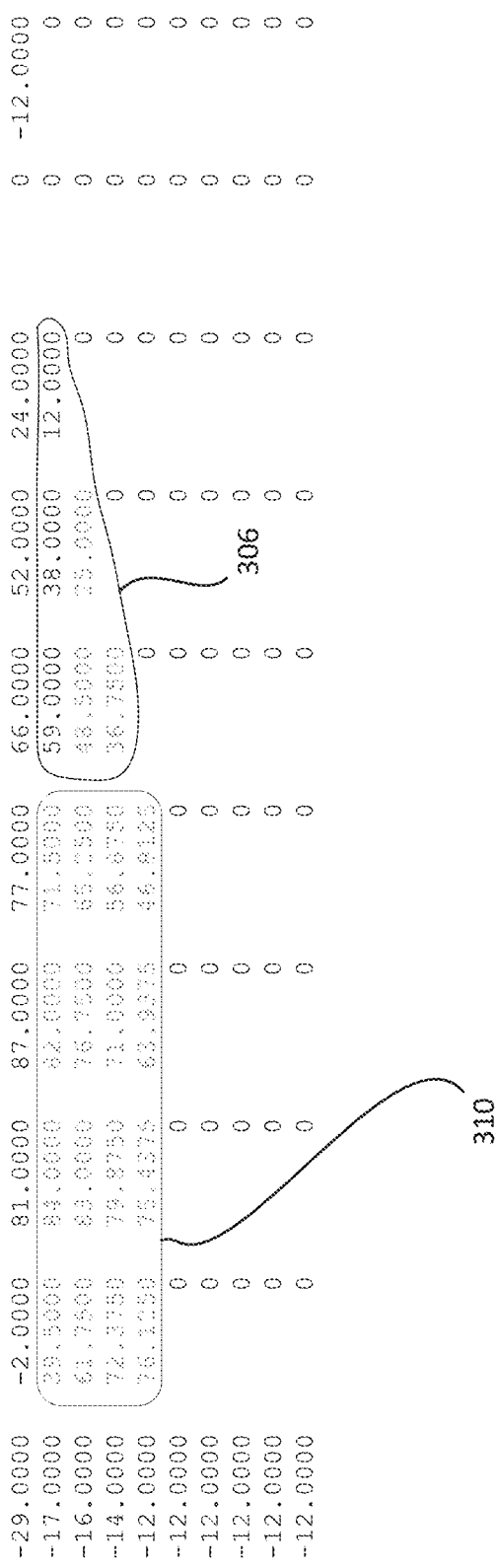
FIG. 10 shows the completed work block, including the predicted block, for the example.

FIG. 10 shows final work block after the prediction block p is completely generated is shown below. Observe that since $f_m(\tilde{x}_{i-1,j+1}, \tilde{x}_{i-1,j}, \tilde{x}_{i-1,j-1}, \tilde{x}_{i,j-1}, \tilde{x}_{i+1,j-1})$ makes use of $\tilde{x}_{i-1,j+1}$, pixel positions denoted by reference numeral 306 outside of the predicted block are predicted in order to generate the prediction block p, which is denoted by reference numeral 310.

It should be noted that the inverted L-shaped template in FIG. 7 and raster traversing order are used in the above examples for the purpose of illustration. Other combinations of templates and traversing orders may be used in practical applications.

Further observe that for any mode m that uses linear interpolation with fractional weights, i.e., $$w_a + w_b + w_c + w_d + w_e = 1$$

$$\max(w_a, w_b, w_c, w_d, w_e) < 1, \text{ and}$$

$$\min(w_a, w_b, w_c, w_d, w_e) < 0$$

by using rolling prediction, effectively more previously reconstructed pixels (as reference samples) are involved in generating prediction at positions farther away from previously reconstructed pixels than at positions closer to the reconstruction pixels. Note that in the example above, two reconstructed pixels are used to generate $p_{1,j}$, j=1, 2, 3, 4, three reconstructed pixels are effectively used to generate $p_{2,j}$, four reconstructed pixels are effectively used to generate $p_{3,j}$, and five reconstructed pixels are effectively used to generate $p_{4,j}$. Such behavior typically leads to more robust and more efficient prediction than existing directional intra prediction solutions which in contrast use the same number of previously reconstructed pixels to generate prediction for all positions in the current block regardless their respective distances to the reference samples. This behavior is not limited to the example above, and applies to other combinations of prediction functions, templates, and traversing orders, as long as fractional weights are used to propagate prediction.

Once a prediction block is generated, the prediction block may be further processed in some embodiments, e.g. by using a filter. The purpose of doing so may be to take advantage of the a priori knowledge about the original image block so that the prediction block after processing does not introduce artefacts that are not present in the original image block. Such artefacts include, for example, frequency components introduced in the prediction process that are known a priori to be not present in the original blocks.

Note that the proposed solution has the effect of smoothing the prediction for pixels that are away from the reference samples. Hence some existing filtering used in combination with current prediction method like intra smoothing might not be necessary with rolling intra prediction. Instead, filters that are specifically designed to make sure the prediction has certain characteristics, e.g. a band-limited filter to allow certain band signals to pass, might be used together with the proposed solution in some implementations.

The rolling intra prediction process described herein may be integrated as additional modes with existing block-based intra prediction modes defined in AVC, HEVC, AVS2, or other image and video coding standards (developed or being developed). It is also possible to replace existing block-based intra prediction modes with rolling intra prediction.

To disable or enable the use of rolling intra prediction modes in an image block, a picture, a subset of a picture, or a group of pictures, a binary flag may be signaled in the bitstream. For example, a set flag indicates that the rolling intra prediction modes are used and a cleared flag indicates that the rolling intra prediction modes are not used.

More generally, a binary flag may be signaled in the bitstream to indicate whether a (predefined) subset of all available prediction modes is used or not. If there is more than one subset to be controlled, more than one such flag may be signaled.

Figure 11:
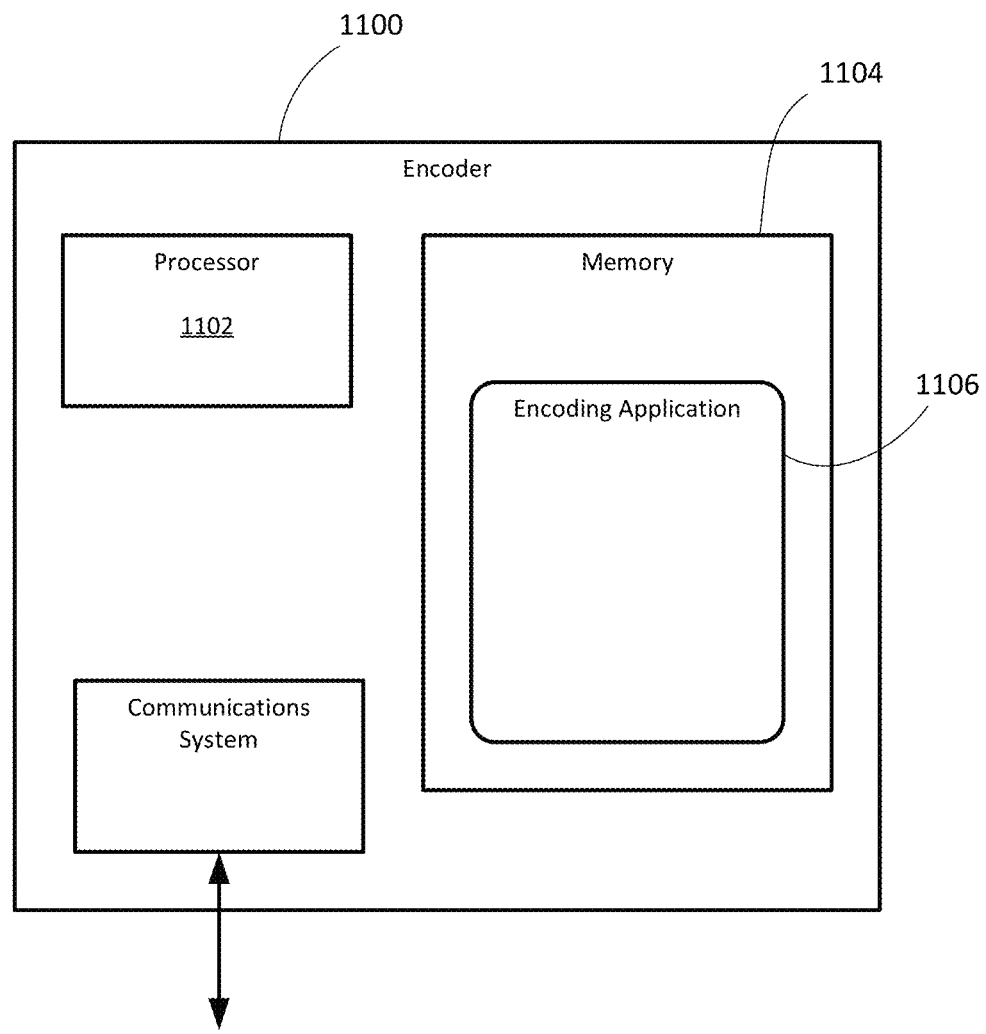
FIG. 11 shows a simplified block diagram of an example embodiment of an encoder.

Reference is now made to FIG. 11, which shows a simplified block diagram of an example embodiment of an encoder 1100. The encoder 1100 includes a processor 1102, memory 1104, and an encoding application 1106. The encoding application 1106 may include a computer program or application stored in memory 1104 and containing instructions that, when executed, cause the processor 1102 to perform operations such as those described herein. For example, the encoding application 1106 may encode and output bitstreams encoded in accordance with the processes described herein. It will be understood that the encoding application 1106 may be stored in on a non-transitory computer-readable medium, such as a compact disc, flash memory device, random access memory, hard drive, etc. When the instructions are executed, the result is configuring the 1102 processor so as to create a special-purpose processor that implements the described process(es). Such a processor may be referred to as a "processor circuit" or "processor circuitry" in some examples.

Figure 12:
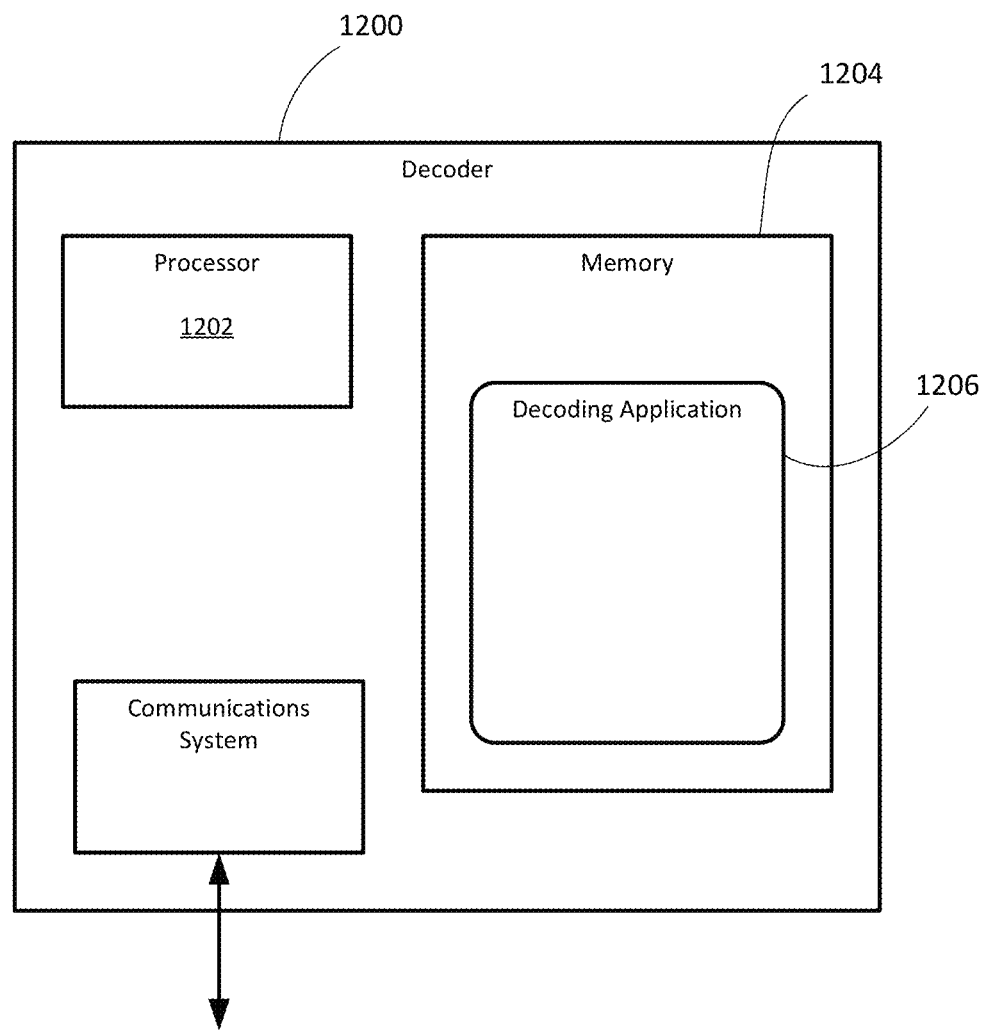
FIG. 12 shows a simplified block diagram of an example embodiment of a decoder.

Reference is now also made to FIG. 12, which shows a simplified block diagram of an example embodiment of a decoder 1200. The decoder 1200 includes a processor 1202, a memory 1204, and a decoding application 1206. The decoding application 1206 may include a computer program or application stored in memory 1204 and containing instructions that, when executed, cause the processor 1202 to perform operations such as those described herein. It will be understood that the decoding application 1206 may be stored in on a computer-readable medium, such as a compact disc, flash memory device, random access memory, hard drive, etc. When the instructions are executed, the result is configuring the 1202 processor so as to create a special-purpose processor that implements the described process (es). Such a processor may be referred to as a "processor circuit" or "processor circuitry" in some examples.

It will be appreciated that the decoder and/or encoder according to the present application may be implemented in a number of computing devices, including, without limitation, servers, suitably-programmed general purpose computers, audio/video encoding and playback devices, set-top television boxes, television broadcast equipment, and mobile devices. The decoder or encoder may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the decoder and/or encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of decoding an image in a video or image decoder from a bitstream, the method comprising:
    decoding a mode from the bitstream for a current block, the current block having a plurality of neighboring reference samples from an adjacent block, wherein the mode is associated with a prediction function;
    selecting a template from among a plurality of templates based on a traversing order, wherein the template specifies relative locations of three or more nearby pixels to be used as inputs to the prediction function for a particular pixel;
    constructing a predicted block of predicted pixels for the current block, wherein constructing includes selecting the traversing order according to the mode decoded from the bitstream and, in the traversing order,
        determining at least some of the predicted pixels based on the prediction function and the template with one or more of the neighboring reference samples as inputs to the prediction function, and
        determining at least some other of the predicted pixels based on the prediction function and the template with the at least some of the predicted pixels as inputs;
    decoding residual data to create a reconstructed residual block for the current block; and
    reconstructing the current block as the sum of the predicted block and the reconstructed residual block.

2. The method claimed in claim 1, wherein the determining at least some other of the predicted pixels is based on the prediction function excluding any neighboring reference samples as inputs.

3. The method claimed in claim 1, wherein the neighboring reference samples comprise previously-reconstructed pixels neighboring the current block.

4. The method claimed in claim 1, wherein the prediction function comprises a linear function of two or more pixels near the particular pixel.

5. The method claimed in claim 1, wherein the traversing order is a horizontal raster scan order.

6. The method claimed in claim 1, wherein constructing comprises defining a work block in memory, populating a first column and a first row of work block samples of the work block with the neighboring reference samples, and determining, in a traversing order, additional work block samples of the work block based on the prediction function and the template, and wherein a portion of the additional work block samples comprise the predicted pixels.

7. The method claimed in claim 6, wherein constructing further comprises determining a work block size based on a size of the predicted block and based on the mode.

8. A decoder for decoding an image from a bitstream, the image being partitioned into blocks and having a current block, the decoder comprising:
    a processor;
    memory storing a plurality of neighboring reference samples from an adjacent block; and
    a decoding application containing instructions executable by the processor that, when executed, cause the processor to
        decode a mode from the bitstream for the current block, wherein the mode is associated with a prediction function,
        select a template from among a plurality of templates based on traversing order, wherein the template specifies relative locations of three or more nearby pixels to be used as inputs to the prediction function for a particular pixel;
        construct a predicted block of predicted pixels for the current block, wherein constructing includes selecting the traversing order according to the mode decoded from the bitstream and, in the traversing order,
        determining at least some of the predicted pixels based on the prediction function and the template with one or more of the neighboring reference samples as inputs to the prediction function, and
        determining at least some other of the predicted pixels based on the prediction function and the template with the at least some of the predicted pixels as inputs, and
        decode residual data to create a reconstructed residual block for the current block; and
        reconstruct the current block as the sum of the predicted block and the reconstructed residual block.

9. A non-transitory processor-readable medium storing processor-executable instructions for decoding an image in a video or image decoder from a bitstream, wherein the processor-executable instructions, when executed by a processor in the video or image decoder, cause the processor to perform the method of:
    decoding a mode from the bitstream for a current block, the current block having a plurality of neighboring reference samples from an adjacent block, wherein the mode is associated with a prediction function;
    selecting a template from among a plurality of templates based on a traversing order, wherein the template specifies relative locations of three or more nearby pixels to be used as inputs to the prediction function for a particular pixel;
    constructing a predicted block of predicted pixels for the current block, wherein constructing includes selecting the traversing order according to the mode decoded from the bitstream and, in the traversing order,
        determining at least some of the predicted pixels based on the prediction function and the template with one or more of the neighboring reference samples as inputs to the prediction function, and
        determining at least some other of the predicted pixels based on the prediction function and the template with the at least some of the predicted pixels as inputs;
    decoding residual data to create a reconstructed residual block for the current block; and reconstructing the current block as the sum of the predicted block and the reconstructed residual block.

10. A method of encoding an image in a video or image encoder to produce a bitstream, the method comprising:
- selecting a mode for a current block, the current block having a plurality of neighboring reference samples from an adjacent block, wherein the mode is associated with a prediction function;
- selecting a template from among a plurality of templates based on a traversing order, wherein the template specifies relative locations of three or more nearby pixels to be used as inputs to the prediction function for a particular pixel;
- constructing a predicted block of predicted pixels for the current block, wherein constructing includes selecting the traversing order according to the mode selected for the current block and, in the traversing order,
  - determining at least some of the predicted pixels based on the prediction function and the template with one or more of the neighboring reference samples as inputs to the prediction function, and
  - determining at least some other of the predicted pixels based on the prediction function and the template with the at least some of the predicted pixels as inputs;
- determining residual data as the difference between the current block and the predicted block; and
- encoding the residual data and the selected mode for output as a portion of the bitstream.

11. The method claimed in claim 10, wherein the determining at least some other of the predicted pixels is based on the prediction function excluding any neighboring reference samples as inputs.

12. The method claimed in claim 10, wherein the neighboring reference samples comprise previously-reconstructed pixels neighboring the current block.

13. The method claimed in claim 10, wherein the prediction function comprises a linear function of two or more pixels near the particular pixel.

14. The method claimed in claim 10, wherein the traversing order is a horizontal raster scan order.

15. The method claimed in claim 10, wherein constructing comprises defining a work block in memory, populating a first column and a first row of work block samples of the work block with the neighboring reference samples, and determining, in a traversing order, additional work block samples of the work block based on the prediction function and the template, and wherein a portion of the additional work block samples comprise the predicted pixels.

16. The method claimed in claim 15, wherein constructing further comprises determining a work block size based on a size of the predicted block and based on the mode.

17. An encoder for encoding an image to produce a bitstream of encoded data, the image being partitioned into blocks and having a current block, the encoder comprising:
- a processor;
- memory storing a plurality of neighboring reference samples from an adjacent block; and
- an encoding application containing instructions executable by the processor that, when executed, cause the processor to
  - select a mode for the current block, wherein the mode is associated with a prediction function,
  - select a template from among a plurality of templates based on a traversing order, wherein the template specifies relative locations of three or more nearby pixels to be used as inputs to the prediction function for a particular pixel;
  - construct a predicted block of predicted pixels for the current block, wherein to construct includes to select the traversing order according to the mode selected for the current block and, in the traversing order,
    - to determine at least some of the predicted pixels based on the prediction function and the template with one or more of the neighboring reference samples as inputs to the prediction function, and
    - to determine at least some other of the predicted pixels based on the prediction function and the template with the at least some of the predicted pixels as inputs, and
  - determine residual data as the difference between the current block and the predicted block; and
  - encode the residual data and the selected mode for output as a portion of the bitstream.

18. A non-transitory processor-readable medium storing processor-executable instructions for encoding an image in a video or image encoder to produce a bitstream, wherein the processor-executable instructions, when executed by a processor in the video or image encoder, cause the processor to perform the method of:
- selecting a mode for a current block, the current block having a plurality of neighboring reference samples from an adjacent block, wherein the mode is associated with a prediction function;
- selecting a template from among a plurality of templates based on a traversing order, wherein the template specifies relative locations of three or more nearby pixels to be used as inputs to the prediction function for a particular pixel;
- constructing a predicted block of predicted pixels for the current block, wherein constructing includes selecting the traversing order according to the mode selected for the current block and, in the traversing order,
  - determining at least some of the predicted pixels based on the prediction function and the template with one or more of the neighboring reference samples as inputs to the prediction function, and
  - determining at least some other of the predicted pixels based on the prediction function and the template with the at least some of the predicted pixels as inputs;
- determining residual data as the difference between the current block and the predicted block; and
- encoding the residual data and the selected mode for output as a portion of the bitstream.

\* \* \* \* \*